3,078,548
METHOD OF MAKING A BEARING
Fred L. Eubeler, 2111 S. 61st Ave., Cicero, Ill.
No Drawing. Filed Mar. 29, 1954, Ser. No. 419,613
7 Claims. (Cl. 29—148.4)

This invention relates to a ball bearing and to a method of treating and producing a ball bearing. It has for one purpose to provide a ball bearing of small size and a method of treating the ball bearing to reduce corrosion. If a ball bearing is stored for a time sufficient to permit the lubricant to evaporate, pitting will result. While the invention is not limited in its application to ball and other antifriction bearings of small size, it is of prime importance in connection with the manufacture of small ball bearings and it may also be embodied in small antifriction bearings of other types.

Another object of the invention is to provide a method for making antifriction bearings by means of which the bearing parts are provided with a plating of relatively noncorrosive material, whereby the likelihood of corrosion is substantially reduced and pitting is eliminated.

Another object is to provide a method for making antifriction bearings in which the bearing is provided with a gold coating.

Another object is to provide a method and a formula for plating antifriction bearings with gold under such conditions that a previously formed and tempered ferrous bearing is not warped or otherwise distorted, and in the application of which the physical properties produced by previous heat treatment in the bearing or parts of the bearing are not substantially altered by the subsequent plating.

Thus, an object of the invention is to provide a bearing which is generally free from tarnishing, oxidation and corrosion, and to provide a method for producing such a bearing and particularly to provide a method for plating the parts of such a bearing with gold.

Other objects will appear from time to time throughout the specification and claims.

As stated above, the invention finds prime importance in connection with the production and treatment of small ferrous bearings. Very small bearings may be used in many places and bearings of ball and other antifriction types are made in extremely small sizes. For some purposes such bearings replace conventional jewel bearings. Where steel or other ferrous bearings are used and where they are of extremely small size, it is difficult, if not to say impossible, to prevent corrosion. The ordinary use of lubricants of whatever nature, and other materials which may resist corrosion, has not proven effective and the life of such small ball bearings is short and, consequently, their expense is substantial where they must be frequently replaced. One use of such bearings is in delicate instruments used in navigation in the case of surface craft and aircraft, and electronic control devices. Generally in connection with measuring and other accurate instruments it is vital that the bearings remain accurate and, consequently, in the past it has been necessary to replace bearings frequently. When a bearing is made of extremely small size, a single relatively minute occurrence of corrosion, which would be unimportant in a large bearing, because of its relatively small size as compared to the total size of the bearing, will, in the case of the small bearing, be sufficient to destroy its accuracy. A flake of rust of a given size in a bearing, which has, for example, an inner race with a diameter of 2″, might be relatively unimportant, but the same flake of rust occurring in a bearing in which the inner race is in the diameter of .65 mm. will be tremendous in relation to the total size of the race, or the balls, or any other part of the bearing. Thus, experience has shown that corrosion which in a larger bearing would have no serious effect in the accuracy or life of the bearing, is destructive of the accuracy of the small bearing. No amount of careful lubrication and other treatment can completely eliminate corrosion.

In the present invention the solution to the problem indicated has been accomplished by plating the bearing preferably throughout, but certainly by plating its moving parts, with a coating or plate of material which will not tarnish, oxidize, nor corrode. For most purposes in bearings of small size it is satisfactory to apply a gold plate, and the particular form of the invention disclosed herein deals with gold-plated bearings and with the method of providing the gold plate on the bearings. The bearings are, as indicated, of small size, and the gold coating or deposit will be of very thin section. A gold deposit of 0.000002 inch is used. Obviously the thickness of the plate may vary, but satisfactory results have been attained in use with bearings having a gold deposit or plate of the thickness indicated, and this figure is given merely as illustrative of the fact that a thin gold plate is satisfactory. Obviously the invention is not limited to any particular thickness of gold plate.

The method of plating the small sized or miniature ball bearings to produce the anticorrosion conditions above referred to may include the following steps: The bearings, the plating of which is described below, are ball bearings, although the invention is not limited to the treatment or production of ball bearings. The ball bearings, including the inner and outer races and the balls, are cleaned after they have been completely manufactured and heat treated. They will not be assembled together at the time of the cleaning. Normally such bearings are formed of steel of suitable analysis for the work which they must accomplish and for use under the conditions for which they are designed. The cleaning may conveniently be carried out with a hot solution of orthosilicates and metasilicates of sodium, and with an electric current density of approximately 10 amperes per square foot. This is a suitable cleaning solution and process but the invention is not limited to a particular type of cleaning.

After the parts of the bearing have been cleaned in the above bath, or otherwise, the parts are copper-plated and as a result of this treatment all of the balls and all of the races undergoing treatment are given a copper plating. The thickness of the copper deposit or plate is preferably regulated to 0.00002 inch. As stated above in reference to the thickness of the gold plate, the invention is not limited to this thickness of copper deposit, but experience in practical use has shown that this is adequate for most miniature ball bearings.

After the cleaning above mentioned, or other suitable cleaning, the parts are given the copper plating in the following manner: They are plated in a liquid bath containing 22.5 grams per litre of cuprous cyanide (this is 30 ounces per gallon). In the same bath there are included 34 grams per litre of sodium cyanide (this is 4.5 ounces per gallon), and, finally, in the bath there is present 50 grams per litre of sodium carbonate (this is 2 ounces per gallon). The bath thus contains cuprous cyanide, sodium cyanide and sodium carbonate, generally in the proportions indicated.

In this bath, made in the proportions above indicated, the copper plating is carried out at a temperature ranging from 30 to 40 degrees C. (86 to 104 degrees F.) and at current densities of the order of 0.3 to 1.5 amperes per square decimeter (2.8 to 14 amperes per square foot). The cathode efficiency is maintained at from 50 to 90 percent. Although other types of copper plating baths may be used to provide a copper plate on the ball bearing parts, the bath and plating conditions indicated are preferable. Owing to the small dissociation of the complex copper cyanide ion $Cu(CN)_3$, the concentration of cuprous ions in the bath is very low. Deposits obtained from this bath are fine-grained and thus suitable for producing the type of copper plating desired.

If desired, Rochelle salt is included in the bath and where present the Rochelle salt in the alkaline copper cyanide solution permits the use of appreciably higher current densities than would otherwise be possible. The following table indicates suitable ranges of ingredients for the bath when Rochelle salts are included:

| Substance | Ounces/ Gallons | Grams/litre |
| --- | --- | --- |
| Cuprous Cyanide | 3.5-5.5 | 26.2-41.2 |
| Sodium Cyanide | 4.6-6.8 | 34.5-51 |
| Free Cyanide | 0.75 | 5.6 |
| Rochelle Salt | 8.0 | 60 |
| Sodium Carbonate | 4.0 | 30 |

When the bath, in the proportions last above indicated, including Rochelle salts, is used, it may be operated at temperatures ranging from 60 degrees to 88 degrees C. (140 to 190 degrees F.) and at current densities of 2.16 to 9.7 amperes per square decimeter (20 to 90 amperes per square foot). With either solution and either range of temperatures and current densities, the thickness of the copper deposit or plate is regulated to approximately 0.00002 inch. After the completion of the copper plating, the parts which have been plated, namely the balls and the races, are thoroughly rinsed, dried and are placed in the gold electroplating solution. This solution is preferably formed of solutions of double cyanide of gold and potassium.

The gold plating cyanide bath is operated within a temperature range of 45 to 80 degrees C. (113 to 176 degrees F.) and at current densities of 0.1 to 0.5 ampere per square decimeter (1.5 to 5.0 amperes per square foot) at 2 to 3 volts. As above mentioned, this treatment will be carried out to produce a gold deposit on the bearing parts having a thickness of the order of 0.000002 inch.

Generally, the choice of the plating procedure will be governed by the fact that the lower the temperature of the plating bath, the higher the current may be. This is due to the fact that the current used tends to heat the parts under treatment and to heat the bath. Excessive heat will warp or otherwise distort the races and thus render them inaccurate or useless. Consequently, the conditions which prevail during the plating treatments must be such that the temperatures do not rise high enough to cause distortion of the bearing parts. Obviously where such miniature bearings of such extremely small size may be made and treated according to the present method, very minor distortion would prove fatal to the accuracy of the bearings. Hence, it is important to consider at all times the necessary procedures to maintain the temperatures of the baths and the temperatures of the parts undergoing treatment within a safe range to prevent any distortion which would be damaging to the accuracy of the bearings. The temperatures and temperature ranges indicated are within the safe range of treatment for the solutions and solution ranges indicated. Where a gold solution is required it is understood that 20 carat gold solution is suitable and is generally preferable. Where copper plating has been referred to as comprising the first plating put upon the ferrous bearing parts, it is to be understood that this coating or plating is a pure, or substantially pure, plating of copper.

Where the bearing is referred to as comprising races and rolling members and the method is described as applied to these parts, it is to be understood that generally ball- or roller-retainers or cages may be present and whenever they are to be present in the completed bearing, they are preferably given the same treatment as the other parts and are plated, preferably, in the same manner and to the same degree as the other parts are plated.

In the processes disclosed herein whatever the precise range of temperatures or the times used for plating or the solutions used in the plating treatment, the thickness of the copper and gold plate is rigidly controlled so that the thicknesses of the platings are held within the clearance tolerances which must be maintained when the bearing is assembled. The bearings as made and before plating, would be considered complete and ready for assembly and use. They are, of course, made with close tolerances. These tolerances are sufficient to permit the additions of the copper and gold plates but these plates must be closely held to a thickness which is permitted by the tolerances provided in the manufacture of the bearings. Where the gold solution is spoken of above, it is pointed out that a 20 carat solution is suitable and for some purposes is preferable. The invention is not limited to any particular carat rating and a gold solution of 18, or even 14, carats, and in some cases even lower, may be used satisfactorily. In the case of bearings of larger outside diameter which would not be considered as "miniature" bearings, it is generally satisfactory to use a gold solution with a lower carat rating than that used in the smaller miniature bearings.

The straight gold plating method and the method of gold plating in which Rochelle salts are present, may be used on antifriction bearings generally and is not limited to the use on ball bearings. Roller, needle and other types of antifriction bearings may be treated by this plating method. Generally where such antifriction bearings include parts other than the races and the rolling members, all component parts which make up the complete bearing will preferably be plated. This will include ball cages, roller cages, retainers and any other component parts present. It is recognized that in some situations only the races and the rolling members might be plated and some advantage obtained even without plating the entire assembly and all of the component parts. Experience has shown, however, that it is generally preferable to plate all of the component parts present in a completed bearing.

Without limiting the invention to any particular dimensions or sizes of bearings, it is pointed out that bearings have been treated according to the method disclosed and have been made according to the details above disclosed with outside diameters as small as those indicated by the seven following sizes:

| | |
| --- | --- |
| .1000" | .2500" |
| .1250" | .3125" |
| .15625" | .3750" |
| .1875" | |

The invention is, of course, not limited to these or to any other particular sizes and the sizes mentioned are given merely as illustraitve of commercial sizes which have been successfully produced according to the teachings of the invention.

The gold plating of the bearing component parts is not intended normally to eliminate the necessity of lubricating the bearings. However, should no lubricant be used or should the lubricant, after having been present in the bearings, become displaced or exhausted, the bearing will nonetheless function for a considerable time. The friction created in the gold-plated bearing between the races and the rolling members is substantially less than that present in an otherwise identical bearing where the component parts have not been plated. In the gold plated bearing, the gold itself acts as a lubricant in the absence of any other specific lubricant and thus, the advantage of the "freezing" together of parts which is always present in the unplated bearing in the absence of lubricant is eliminated or very substantially reduced.

An important advantage of the invention is that it provides a corrosion-resistant treatment for bearings which may be applied to bearings which are otherwise fully complete and could have been put in operation without this corrosion-resistant treatment. Thus the bearings, if for example they are made of steel, as is conventional, will have been finished ground or otherwise shaped within the necessary tolerances and are ready for insertion in machines and mechanisms for use without any further treatment. At this stage they will have been given the necessary heat treatments to render them suitable for the use for which they are intended. The method of the present invention is carried out at temperatures low enough to leave the physical structure and the physical properties generally of the bearings and bearing parts substantially unchanged. The plating steps are not carried out at temperatures sufficiently high to alter to any substantial extent the physical structure of the bearing parts, and in particular the plating temperatures are not permitted to rise high enough to effect the bearings sufficiently to cause warping, distortion, or any change in shape or physical structure. It is important also that the corrosion-resistant plating which is applied by the method of the invention to produce the bearings of the invention, since it is carried out on fully complete bearings made to working tolerances for actual use, is such that the final thickness of the plating is in the tolerances of the bearing. Upon the completion of the plating the bearing is ready for use and may be put into use at once. Therefore, a bearing to be treated by the method of this invention requires no special pretreatment and requires no special formation which it would not require if it were conventional and were intended to be put into use without any plating or other comparable treatment.

The use of Rochelle salts has been spoken of above and this is contemplated under certain conditions. Generally, Rochelle salts will be included in the plating solution only when it is desired to get a relatively heavy plate for a relatively large bearing. In the case of extremely small bearings, of necessity the clearances are close and only a relatively thin plate may be used. In the case of relatively large bearings a thicker plate may be used and is advantageous and in that case a solution containing Rochelle salts will normally be used.

I claim:

1. The method of producing a corrosion-resistant antifriction bearing which includes the following steps: forming an outer and an inner bearing race of ferrous material, forming a plurality of ferrous balls, heat treating said bearing members and thereby tempering them, and sequentially thereafter forming a plating of copper on all of the bearing members, thereafter forming about each of said bearing members a gold plating superimposed upon, distinct from, and in intimate contact with said copper plating, and finally assembling together said plated inner race and said plated outer race and positioning between them the desired number of plated balls to complete an antifriction bearing, said plating being formed at a temperature less than that required to change the physical identity and structure of said bearing parts.

2. The method of producing a corrosion-resistant antifriction bearing which includes the following steps: forming an outer and an inner bearing race, forming a plurality of balls, heat treating said bearing members and thereby tempering them, and sequentially thereafter forming a plating of copper on all of the bearing members, said copper plating being provided electrically, thereafter forming about each of said bearing members a gold plating superimposed upon and in intimate contact with said copper plating, said gold plating being formed by electroplating, and finally assembling together said plated inner race and said plated outer race and positioning between them the desired number of plated balls to complete an antifriction bearing, said plating being formed at a temperature less than that required to change the physical identity and structure of said bearing parts.

3. The method of producing a corrosion-resistant antifriction bearing which includes the following steps: forming an outer and an inner bearing race, forming a plurality of balls, heat treating said bearing members and thereby tempering them, thereafter providing a plating of copper on all of the bearing members and completely surrounding each of them, said copper plating being provided electrically, thereafter forming completely about each of said bearing members a gold plating superimposed upon and in intimate contact with said copper plating, said gold plating being formed by electroplating, and finally assembling together said plated inner race and said plated outer race and positioning between them the desired number of plated balls to complete an antifriction bearing.

4. The method of producing a corrosion-resistant antifriction bearing which includes the following steps: forming an outer and an inner bearing race of ferrous material, forming a plurality of ferrous balls, heat treating said bearing members and thereby tempering them, thereafter providing a plating of copper on all of the bearing members, said copper plating being provided electrically, thereafter forming about each of said bearing members a gold plating superimposed upon and in intimate contact with said copper plating, said gold plating being formed by electroplating, and finally assembling together said plated inner race and said plated outer race and positioning between them the desired number of plated balls to complete an antifriction bearing.

5. The method of producing a corrosion-resistant antifriction miniature bearing which includes the steps of forming an outer and an inner bearing race and a plurality of rolling contact members for interpositioning between said races, the dimensions of the members and races as formed providing working tolerances for the assembled races and members, heat treating said members and said races and thereby tempering them, thereafter forming a layer of copper on each race and on each member by plating thereon, and thereafter forming about each of said races and members a gold plating superimposed on and in intimate contact with said copper plating and providing a corrosion-resistant lubricating external surface for each of said members and said races, holding the temperature of said races and said members subsequent to said heat treating and during said plating steps below that required to change the physical structure of the races or to cause alloying of said copper and gold layers, the thickness of said gold layers and copper layers being insufficient to materially effect the working tolerances of said races and said members, and thereafter assembling the inner race and outer race with said members to complete the corrosion-resistant, antifriction bearing.

6. The method set forth in claim 5 wherein said plating is provided electrically and the temperature of the plating baths are held within 190 degrees F.

7. The method of producing a corrosion-resistant antifriction miniature bearing which includes the steps of forming an outer and an inner steel bearing race and a plurality of steel rolling contact members for interpositioning between said races, the dimensions of the members and races as formed providing working tolerances for the assembled races and members, heat treating said members and said races and thereby tempering them, thereafter forming a layer of copper on each race and on each member by plating thereon, and thereafter forming about each of said races and members a gold plating superimposed on and in intimate contact with said copper plating and providing a corrosion-resistant lubricating external surface for each of said members and said races, holding the temperature of said races and said members subsequent to said heat treating and during said plating steps below that required to change the physical structure of the races or to cause alloying of said copper and gold layers, the thickness of said gold layers and copper layers being insufficient to materially effect the working tolerances of said races and said members, and thereafter assembling the inner race and outer race with said members to complete the corrosion-resistant, antifriction bearing.

References Cited in the file of this patent

UNITED STATES PATENTS

| | | |
|---|---|---|
| 895,992 | Eveland | Aug. 11, 1908 |
| 2,242,101 | Atlee | May 13, 1941 |
| 2,315,280 | Skehan et al. | Mar. 30, 1943 |
| 2,477,139 | Patton | July 26, 1949 |